No. 870,852.  
PATENTED NOV. 12, 1907.  
R. SHIPMAN.  
SPEED INDICATOR AND DISTANCE RECORDER.  
APPLICATION FILED NOV. 15, 1906.  
5 SHEETS—SHEET 1.
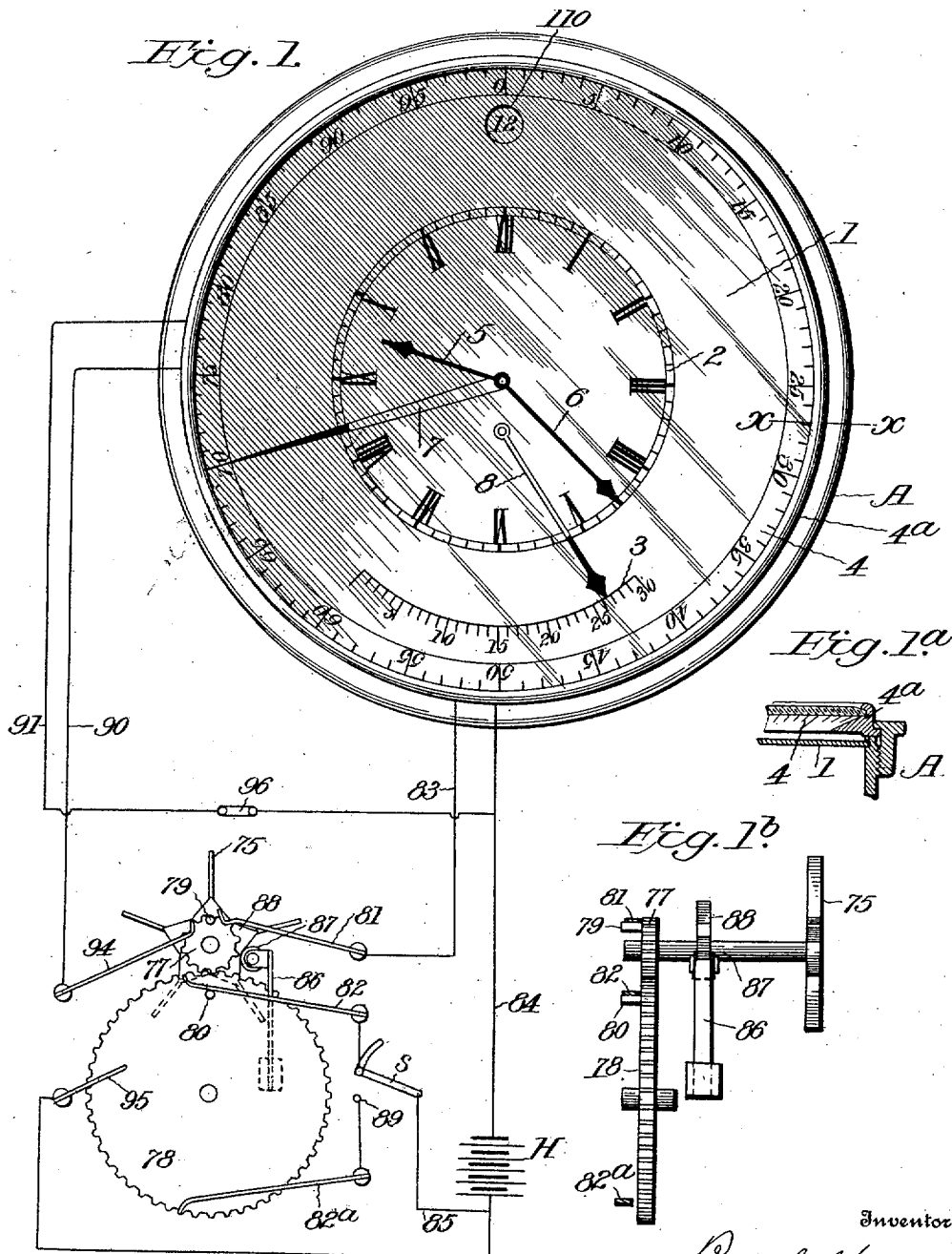

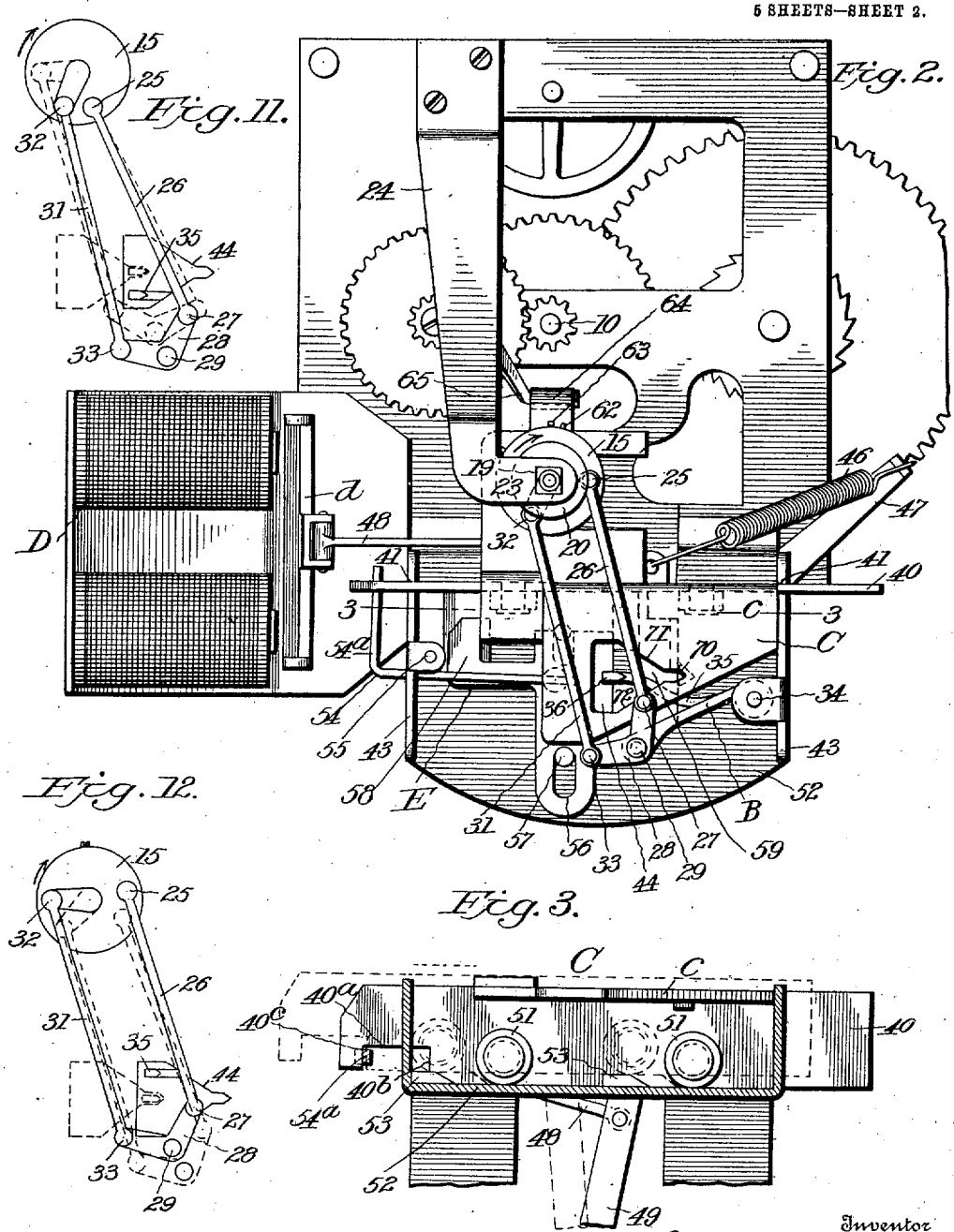

No. 870,852. PATENTED NOV. 12, 1907.
R. SHIPMAN.
SPEED INDICATOR AND DISTANCE RECORDER.
APPLICATION FILED NOV. 15, 1906.
5 SHEETS—SHEET 3.
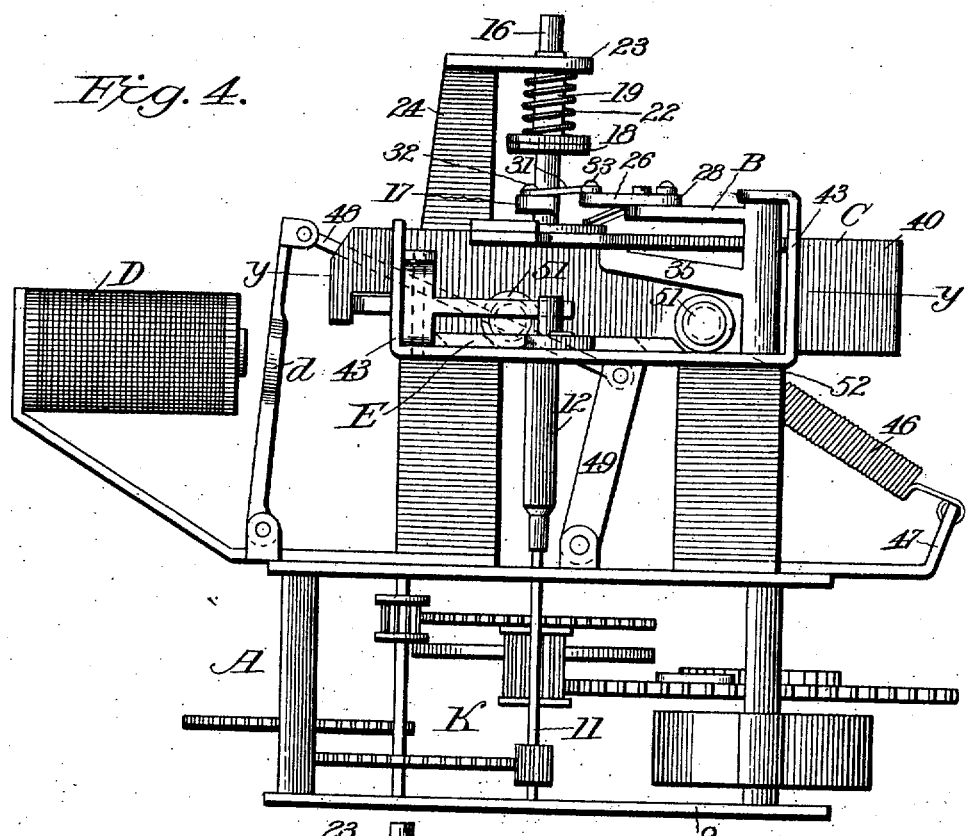
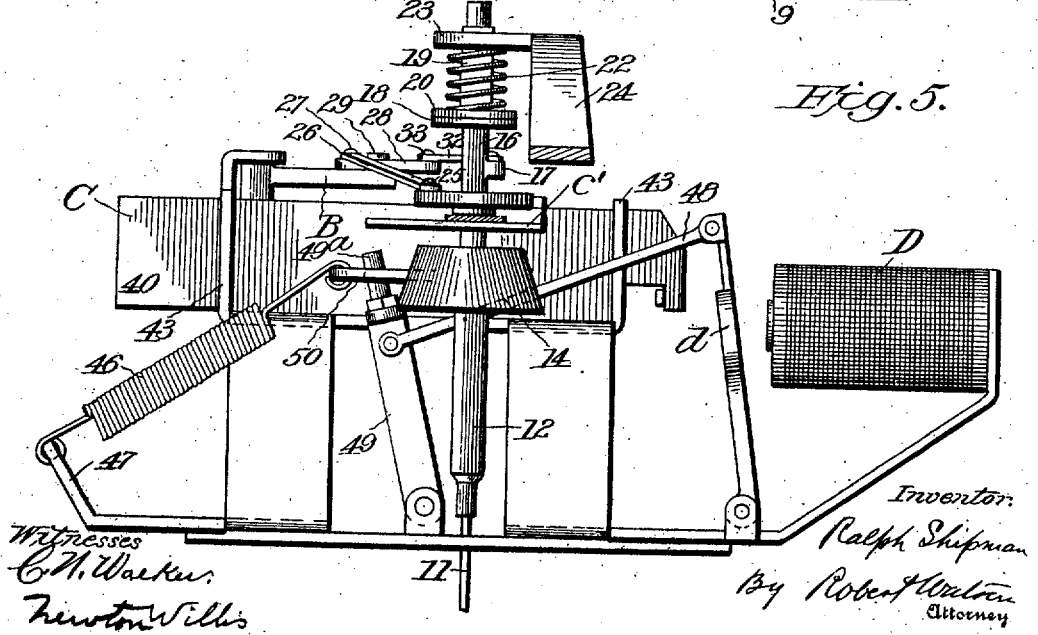

No. 870,852.  
PATENTED NOV. 12, 1907.  
R. SHIPMAN.  
SPEED INDICATOR AND DISTANCE RECORDER.  
APPLICATION FILED NOV. 15, 1906.  
5 SHEETS—SHEET 4.
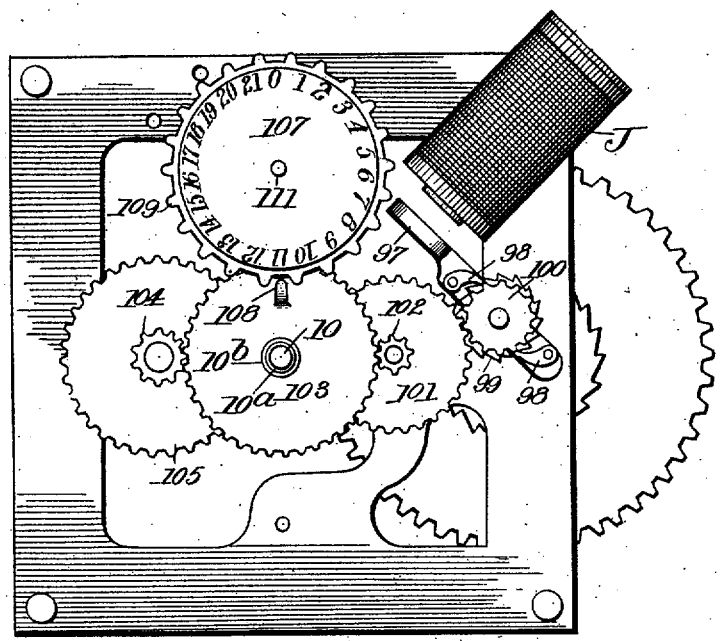
Fig. 13.
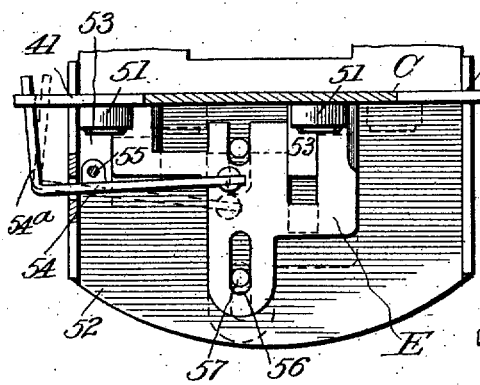
Fig. 4ª.
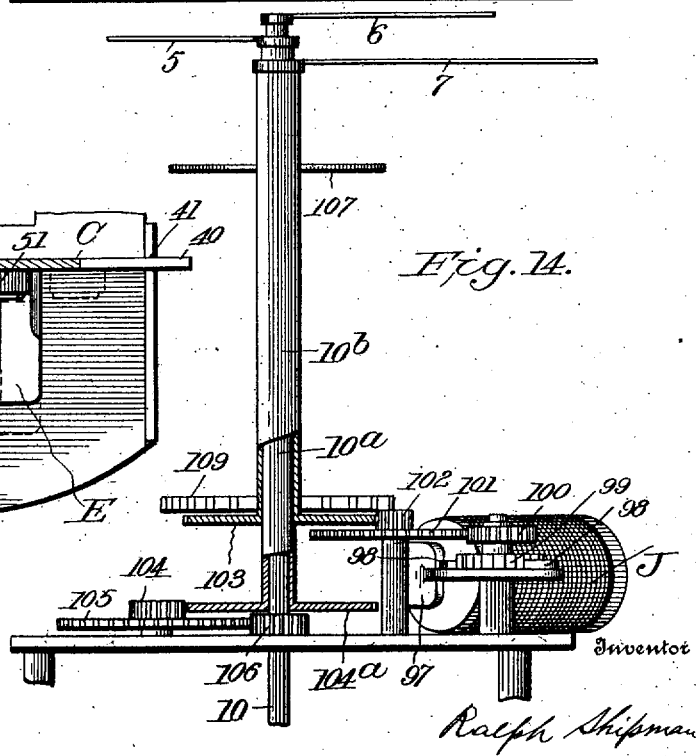
Fig. 14.
Witnesses  
C. N. Walker.  
Newton Willis.
Inventor  
Ralph Shipman  
By Robert Watson  
Attorney No. 870,852. PATENTED NOV. 12, 1907.
R. SHIPMAN.
SPEED INDICATOR AND DISTANCE RECORDER.
APPLICATION FILED NOV. 15, 1906.
5 SHEETS—SHEET 5.
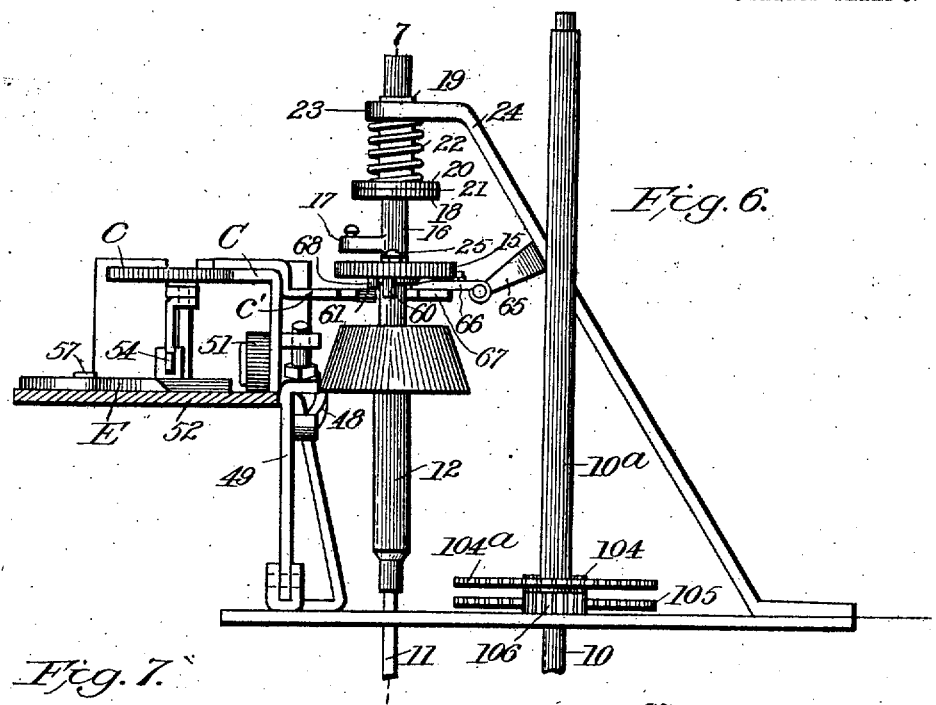
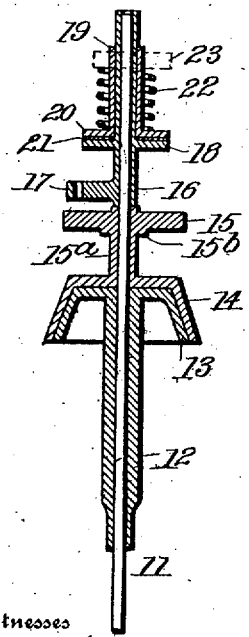
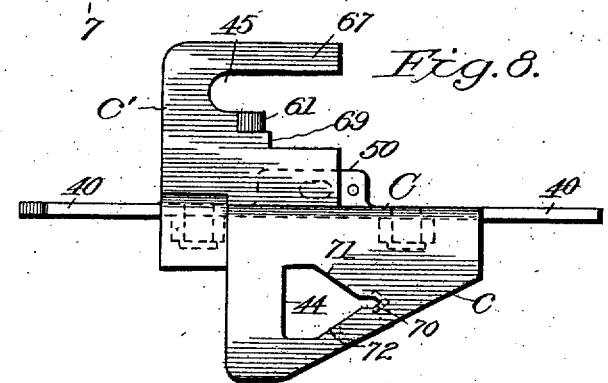
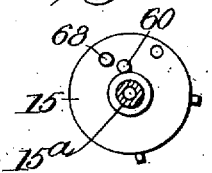
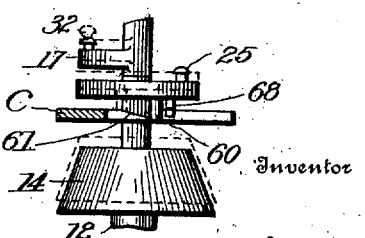
Witnesses
C. H. Walker.
Luton Willis
Inventor
Ralph Shipman
By Robert Wriston
Attorney

UNITED STATES PATENT OFFICE.

RALPH SHIPMAN, OF SUNBURY, PENNSYLVANIA.

SPEED-INDICATOR AND DISTANCE-RECORDER.

No. 870,852.  Specification of Letters Patent.  Patented Nov. 12, 1907.

Application filed November 15, 1906. Serial No. 343,623.

*To all whom it may concern:*

Be it known that I, RALPH SHIPMAN, a citizen of the United States, residing at Sunbury, in the county of Northumberland and State of Pennsylvania, have invented certain new and useful Improvements in Speed-Indicators and Distance-Recorders, of which the following is a specification.

This invention comprises improved means for indicating the speed of vehicles, and also for registering the distance traveled.

By means of my improvements the average speed at which the vehicle has traveled for a given unit of distance is accurately indicated, the indicator arm remaining stationary until the vehicle has traveled over the next unit of distance, when the arm will shift to indicate the average speed maintained during the latter unit, if there has been a change in the average speed, or, if the average speed remains the same while the vehicle travels over successive units of distance, the indicator arm will remain stationary. The device is arranged to indicate in miles per hour the average speed maintained for short distances such as fifty, one hundred or two hundred feet, so that in the ordinary steady travel of the vehicle the indicator will show in miles per hour the speed of the vehicle; but if any change occurs in the average speed for such short unit of distance, the indicator arm will move to indicate the change in the speed. I also provide, in connection with the speed indicator, a distance register for showing the entire distance traveled.

In the accompanying drawing which illustrates my invention, Figure 1 is a top plan view of the indicator, the electric circuits and devices for intermittently closing the same being shown diagrammatically; Fig. 1ᵃ is a vertical section through part of the casing of the instrument on the line *x*—*x* of the Fig. 1; Fig. 1ᵇ is a rear elevation of the circuit-closing mechanism looking from the right of Fig. 1; Fig. 2 is a top plan view of the indicator mechanism; Fig. 3 is a side view of the slide for setting the indicator arm and returning the adjustable clutch member to its initial position, the bed on which the slide moves being shown in section on the line 3—3 of Fig. 2; Fig. 4 is a side elevation of the indicator mechanism; Fig. 4ᵃ is a section on the line *y*—*y* of Fig. 4. Fig. 5 is a section on the line 5—5 of Fig. 2; Fig. 6 is a section on the line 6—6 of Fig. 2, parts of the mechanism being omitted; Fig. 7 is a section on the line 7—7 of Fig. 6; Fig. 8 is a top plan view of the slide or carriage for resetting the adjustable clutch member and the pivotal point of the adjustable lever; Fig. 9 is a bottom plan view of the disk connected to the adjustable clutch member; Fig. 10 is a detail illustrating the operation of the clutch; Figs. 11 and 12 are diagrammatic views illustrating the operation of the speed indicating devices; Fig. 13 is a plan view and Fig. 14 a side view of the registering mechanism.

Referring to Fig. 1 of the drawing, A indicates the casing of the combined speed indicator and distance register having mounted therein a fixed dial-plate 1 provided with a clock-dial 2, and a scale 3 for indicating the speed; and having an adjustable scale 4 for indicating the distance traveled. 5 and 6 indicate the hour and minute hands respectively, and 7 represents a pointer connected with the registering mechanism, as hereinafter explained, for indicating the miles traveled upon the scale 4. A pointer or indicator 8 is movable by the mechanism hereinafter described to indicate upon the scale 3 the average speed which the vehicle makes in traveling a given distance, as, for instance, 20, 30, 50 or 100 feet. With each change in time occupied by the vehicle in traveling unit distance the indicator or pointer 8 is shifted forward or backward to indicate the average speed maintained in traveling said unit of distance.

In Fig. 3 of the drawing, K indicates ordinary clock mechanism, mounted in a suitable frame 9, and having the usual shafts or arbors 10, 10ᵃ (Figs. 2, 6, 13 and 14), for carrying the minute and hour hands, and a shaft 11 corresponding to the shaft which operates the second hand of a clock. Upon the shaft 11 is secured a sleeve 12 carrying at its upper end a clutch member 13 adapted to coöperate with a clutch member 14 which is loosely mounted upon the shaft 11. These clutch members as shown in the drawing, are conical. A disk 15 is connected to and rotatable with the clutch member 14, the arrangement being such that when the clutch member 14 is in engagement with the member 13 the disk 15 will rotate at the same speed as the shaft 11 of the clock which shaft makes one complete revolution in one minute. Above the disk 14, and rotatable upon the shaft 11 is a long sleeve 16 having at its lower end a crank arm 17 and above said crank arm a brake disk 18. The upper end of the sleeve 16 carries the indicator arm or pointer 8. A sleeve 19 surrounds the sleeve 16 above the brake disk 18 and this sleeve 19 has at its lower end a brake disk 20 adapted to bear upon the disk 18 through a suitable leather or composition washer 21. A light coil spring 22 surrounds the sleeve 19 between the disk 20 and a bearing 23 upon a bar 24 which forms a part of the frame of the machine. As shown in Fig. 1 the outer walls of the sleeve 19 are square or angular and the socket or bearing in the arm 24 is correspondingly formed so that the sleeve will not turn within the socket. In the position shown in Fig. 7 wherein the clutch members are in engagement with one another the spring 22 exerts little, if any, downward force upon the disk 20. If the clutch member 14 is raised out of engagement with the member 13, however, it will be seen that the disk 18 will be pressed against the disk 20 and thus the friction between said disks will be increased whenever the clutch members are separated and that the friction between the brake disks will decrease as the clutch members come together.

The disk 15 which is integrally connected with the clutch member 14 has near its periphery a pin 25, to which is connected one end of a link 26, the opposite end of said link being connected by a pivot pin 27 to one arm of a bell-crank float lever 28, which lever is connected by a pivot pin 29 to a movable support B. The crank arm 17 upon the sleeve 16 is similarly connected to the opposite arm of said bell-crank float lever by a link 31, the ends of which are attached to the pivot pins 32 and 33 respectively. The support B is, in the drawing, in the form of a lever hinged at one end upon the pivot pin 34 and it has a laterally extending arm 35, which is provided at its free end with a wedge-shaped projection 36 projecting upwardly from the arm.

A resetting slide C shown in top plan view, detached in Fig. 8, is mounted so as to be movable across the frame toward and from the magnets D. The slide comprises a guide-bar 40, the ends of which are arranged within vertical guide-slots 41 (see Fig. 2) in upright flanges 43 on the frame of the machine, and it has at one side a laterally extending plate $c$ which lies normally in the plane of the wedge shaped head or projection 36 on the movable support B, said plate having an opening 44 into which the projection extends. A plate $c'$ projects laterally from the guide bar at its opposite side, in a plane between the disk 15 and the adjustable clutch member 14. The plate $c'$ is cut away as indicated at 45 to permit the shaft 11 and the sleeve $15^a$ connecting the disk 15 with the clutch bar 14, to pass through, and to allow the plate to reciprocate without interfering with said parts.

The slide C is normally held in the position shown in Fig. 1 by a spring 46 connected to the slide and to the fixed part 47 of the frame. It is movable against the action of the spring by means of the magnets D, the armature $d$ of which is connected by a link 48, to an upright lever 49, which latter has at its free upper end a pintle $49^a$ (Fig. 5) extending through an opening in an ear 50 upon the side of the guide bar 40. This loose connecton between the lever 49 and the slide permits the latter to move towards the magnets in one plane and to return in another plane.

The magnet is momentarily energized, as hereinafter explained, each time the vehicle travels a given distance, thus causing the slide to move towards the magnets, the slide then being immediately returned to its normal position by the spring. In moving toward the magnet, wheels 51 upon the side of the guide bar 40 ride upon the bed 52 of the frame until near the end of this forward movement, when the wheels ride upon the stationary cams 53, which cause the slide to be lifted into the position shown in dotted lines in Fig. 3. The guide bar 40 has a notch $40^a$ cut in its lower edge, and a bell-crank lever 54 pivoted at 55, has one arm $54^b$ extending within said notch and its opposite arm $54^b$ connected to a plate E which is adapted to slide on the bed 52. The plate E has a guide slot 56 through which a guide pin 57 secured to said bed, projects, and it has arms 58 and 59 which, in the normal position of the plate, shown in Fig. 2 are not in the path of the wheels 51. When, however, the slide C has moved toward the magnets and the wheels are upon the stationary cams 53 as indicated in dotted lines in Fig. 3, the shoulder $40^b$ at one end of the notch in the guide bar engages and moves the arm $54^a$ of the lever 54 and thus causes the plate E to move so as to place its arms 58 and 59 in the rear of the cams 53, as shown in Fig. $4^a$. The plate E thus forms a temporary bed higher than the fixed bed 52 upon which the wheels 51 ride while the slide is being returned to its normal position by the spring 46. As the slide nears its normal position the shoulder $40^c$ on the guide bar 40 engages the arm $54^a$ of the lever 54 and causes the lever to move the plate E, which forms the temporary bed, back to its normal position, thus allowing the slide to drop to its lower or normal position. The slide E therefore, in moving towards the magnets travels the greater part of the distance at one level; at the end of this movement it is elevated slightly, and then returns at a higher level and finally at the end of the return movement drops back to its original level. Several functions are accomplished by this movement.

The clutch member 13 moves constantly, rotating once in a minute in the direction of the arrow, Figs. 2, 11 and 12, and when the adjustable clutch member 14 is in engagement with the constantly driven member 13, said member 14 and the disk 15 rotate in the same direction and at the same speed. If the disk 15 rotates slightly beyond the position indicated in Fig. 11, a pin 60, Figs. 6 and 10, rides upon an inclined surface 61 upon the plate $c'$ and elevates the disk 15 and the clutch member 14, as indicated in dotted lines in Fig. 10, so that the member 14 is disengaged from the member 13, and the rotation of the member 14 and disk 15 stops. The pivot pin 25 of the link 26 therefore never travels in the direction of the arrow much beyond the position shown in Fig. 11. The movement of the disk 15 is limited in the opposite direction by a stop pin 62 on the disk (Fig. 2) which engages a fixed stop 63 on a metal leaf or tongue 64 which is hinged at one end upon a support 65, the free end of said leaf extending beneath an angular shoulder $15^b$ under the disk 15, and resting upon the arm 67 of the plate $c'$. The disk 15 has a total rotary movement of about 90°. In Fig. 2 it is shown near the limit of its movement in one direction and in Fig. 11 it is shown near the limit of its movement in the opposite direction.

If the clutch members are engaged when the slide is pulled towards the magnets the slide at the completion of its movement is lifted by the stationary cams 53, and the arm 67 of the slide pressing upward on the hinged leaf 66 causes the latter to bear upwardly upon the shoulder $15^b$ beneath the disk 15, thus causing the disengagement of the clutch members. The disk 15 also has a depending pin 68, shorter than the pin 60, the lower end of the pin 68 being above the plane of the surface of the plate $c'$ in the normal position of the latter; but when the plate is returned by the spring 46 in a higher plane, a shoulder 69 on the plate $c'$ strikes the pin 68 and causes the disk 15 and its connected clutch member 14, which is then disengaged, to turn backward until the stop 62 on the disk strikes the stop 63 on the hinged leaf. When the slide again reaches its normal position, the temporary or movable bed plate E being then withdrawn from beneath the wheels on the slide the latter drops downward onto the bed plate 52 thereby allowing the leaf 66 to swing downward and permitting the adjustable clutch member 14 to engage the constantly driven clutch member 13. Each operation of the slide therefore disengages the clutch members, if they are at that time in engagement and then returns the adjustable clutch member to a given initial position. The hinged leaf 66, which is at right angles to the line of movement of the slide, is interposed between the slide and the shoulder on the disk 15 so that the disk and its connected clutch member will not be turned by frictional contact with the slide.

When the clutch member and disk 15 are raised by the elevation of the slide the brake or friction disk 18 is pressed against the non-rotatable friction disk 20, or against the leather or composition washer between the said disks, the spring 22 being slightly compressed. The sleeve 16 carrying the indicator arm 8 is therefore held against turning when the slide, during its return movement kicks the adjustable clutch member around into its initial position. A soon as said clutch member reaches its initial position and the slide drops to its normal level, the pressure of the disk 18 against the disk 20 is relieved so that the sleeve 16 and the indicator arm or pointer may turn easily, being then retarded only by slight friction. When the adjustable clutch member is moved into its initial position, it engages the time operated clutch member 13 and immediately commences to rotate in the direction of the arrow, thus causing the link 26 to be moved in the direction of its length. As the support B is pivoted at 34, and the friction between the disks 18 and 20 is sufficient to hold the sleeve 16 and arm 17 stationary, the movement of the link 26 will cause the support B to travel away from the position shown in Fig. 2 and carry the pivotal point 29 of the lever 28 away from the axis of the shaft 11 upon which the clutch and sleeve which carries the indicator arm are mounted. This movement is accomplished without disturbing the position of the crank arm 17, which is connected through the sleeve 16 to the indicator arm because the lever 28, connecting the links, turns freely on its pivot 29. As the arm B moves the position of the wedge-shaped head 36 changes with relation to the wedge-shaped notch 70 in the plate c at one side of the opening 44 in said plate. This opening, as shown, has walls 71 and 72 which converge towards the notch 70 so that if the head 36 is out of line with the notch 70 at the time when the plate is drawn to the left by the magnets, it will be guided into notch by one or the other of the inclined walls of the opening. Thus, each time the slide C moves to the left in Fig. 2, the head 36 is brought to a central position, thus causing the pivot pin 29 of the lever 28 to be brought back to the same point with relation to the axis of the shaft 11. If the clutch members are engaged when the plate moves to the left the link 26, being held by the clutch, will not be adjusted forward or backward by the movement of the support B, but the link 31, being then held only by the slight frictional engagement of the disks 18 and 20, and the washer between said disks, will be moved so as to adjust the indicator arm 8 one way or the other, when the pivot pin 29 of the lever is brought to its fixed distance from the axis of the shaft 11 by the engagement of the head 36 with the notch 70 in the plate c.

As soon as the head 36 is centered in the notch 70 giving the required movement to the link 31 and indicator arm 8, the slide C rises upon the cams 53 and the plate c is lifted above the head 36 releasing the head 36 from the notch. This upward movement of the slide, as previously explained, releases the clutch and presses the friction disks 18 and 20 more firmly together. The slide then returns to the right, as before explained, throwing the disengaged clutch member 14 around until the stop 62 strikes the stop 63. During this return or resetting movement of the clutch member 14 the disks 18 and 20 are held in engagement with one another, owing to the elevated position of the slide so that the sleeve 16, crank 17 and indicator arm 8 will not be moved while the clutch member is being reset. When the slide returns to its normal position and drops downward the plate c lies again in the same plane as the head 36.

In Fig. 2 the adjustable clutch member is shown near the commencement of its movement and the crank arm 17 upon the sleeve 16 is in the position which it would occupy when the indicator arm is indicating, say, 26 miles per hour, as indicated approximately on the dial, Fig. 1. This is the average speed which the vehicle traveled during the unit distance preceding the resetting of the clutch member. The armature of the magnet, as before stated, operates to move the slide forward and then releases it after the vehicle wheel has made a stated number of revolutions. If now the vehicle travels slower during the next unit of distance, so that before the slide is operated the pivot pin 25 on the link 26 moves into the position indicated in Fig. 11, the wedge shaped head 36 will be moved past the line of the notch 70 and when the slide is moved by the magnet the cam face 72 in the plate c will engage the wedge-shaped head and guide it into the notch 70. This will cause a movement of the pivot pin 29 on the support B toward the shaft 11 and the clutch members being in engagement until after the head 36 enters the notch 70 the link 31 will force the arm 17 into the position shown in dotted lines in Fig. 11, thus causing the indicator arm 8 to turn to a lower point on the scale 4 which will thus indicate a lower average speed traveled for a unit of distance. When the indicator arm has been set the movable clutch member is released from the constantly driven member and the former is reset as before explained.

In Fig. 12 the movable clutch member is indicated in full lines as having been reset, the stops on the clutch and the hinged leaf being in engagement with one another, and the crank arm 17 which operates the indicator or pointer is shown in full lines in the position which it occupies in dotted lines in Fig. 11. If the speed during the next unit of distance increases, the slide will move to center the pivot pin 29 earlier in the travel of the clutch, and the head 36 upon the movable support B will be engaged by the cam surface 71 and directed into the notch 70, thus causing an outward movement of the pivot pin 29, as indicated in dotted lines in Fig. 12. In said figure the movement of the slide is supposed to have taken place by the time the pin 25 on the link 26 has moved from the position shown in full lines to that shown in dotted lines. Therefore the pivot pin 29 on the support B is moved outward and the link 31 draws the arm 17 into the position shown in said figure so that the indicator or pointer 8 will indicate a higher average speed for the unit distance which is traveled.

In Fig. 1 I have shown diagrammatically a means for operating the slide electrically. In said figure 75 indicates a tappet wheel adapted to be engaged by a tappet 76 upon the vehicle wheel. A pinion 77 is connected to the tappet wheel and meshes with a gear 78 the proportions of the gearing in the drawing being as four to one. Upon the pinion is arranged a contact pin 79 and upon the gear is arranged a contact pin 80. Spring arms 81 and 82 are arranged to engage these contact fingers 79 and 80, respectively, when the tappet wheel is turned. The arm 81 is connected by a conductor 83 to the magnets D and thence by a conductor 84 to the battery H. The arm 82 is connected through a switch s to the opposite pole of the battery by a conductor 85. The pin 79 engages the spring arm 81 each time the pinion rotates but it will be seen that unless the contact pin 80 is in engagement with the arm 82ᵃ the circuit will not be complete. Therefore the magnets D will not be energized except when the pin 80 is in engagement with one arm and the pin 79 in engagement with the other. These pins are so arranged that after the vehicle has traveled a given distance the two pins will engage the contact arms and the circuit will be completed through the gears and the magnet, thereby operating the slide C. A spring arm 86 having a wheel 87 which bears upon a star-wheel 88 is adapted to give a quick and definite movement to the tappet wheel so that the contact between the pin 79 and arm 81 will be short. The switch s is arranged so that when moved into a contact point 89 a spring arm 82ᵃ will be electrically connected to the conductor 85, this arm being in position to engage the pin 80 after the latter has made a one-half revolution. By this means the slide may be actuated twice as many times in a given distance as when the switch is open and the single arm 82 connected. I also provide in connection with the speed indicating apparatus a registering device operated by a magnet J, Fig. 13, the circuit of said magnet being by way of the conductors 90 and 91 to the battery and to the brushes 94 and 95. The brush 95 is permanently grounded on the gear 78 and the brush 94 is arranged so that it will be engaged by the pin 79 on the pinion 88. A switch 96 is arranged in the circuit so that the recording apparatus may be disconnected if desired. In Fig. 13, an armature 97 is arranged adjacent to the magnet J and provided with pawl 98 for engaging and turning a ratchet wheel 99 connected with the pinion 100 of a train of gearing. The remaining gears of the train are indicated by numerals 101, 102 and 103. The gear 103 is secured to a sleeve 10ᵇ, which latter is journaled on the hour-hand arbor 10ᵃ and carries at its upper end the pointer or indicator 7. The gearing is so arranged that the gear 103 will move the sleeve 10ᵇ so as to cause the pointer 7 to advance one point on the scale 4 for each mile traveled. The gear 103 has a tongue 108 which engages a gear 109 on the shaft 111, each time the gear 103 makes one revolution. The gear 109, therefore, turns the distance of one tooth for each revolution of the gear 103. Upon the shaft 111 is arranged a recording wheel 107 which turns with said shaft and with the gear 109. If the gear 103 turns once in one hundred miles the proper numeral on the disk 107 to indicate hundreds will appear at the opening 110 in the dial. Numerals 104, 104ᵃ and 105, 106, indicate clock gears for operating the hour and minute hand shafts or arbors 10ᵃ and 10.

What I claim is—

1. An apparatus for indicating the average speed of a vehicle or other device while moving a given unit of distance comprising a time-operated member, an indicator, mechanism for adjusting said indicator according to the relative position of said member and for resetting said member in an initial position, and means for actuating said mechanism each time the vehicle or device whose speed is to be indicated moves a given distance.

2. A speed indicating apparatus comprising suitable timing mechanism, a member movable thereby, an indicator, mechanism for adjusting said indicator according to the relative position of said member and for resetting said member in an initial position, and means for actuating said mechanism each time the device whose speed is to be measured moves a given distance.

3. A speed indicating apparatus comprising a time operated member, an indicator, a float lever, links connecting the arms of said lever with said member and indicator respectively, and means for moving the pivotal point of said lever to a given position and for resetting said member in an initial position each time the device whose speed is to be measured moves a given distance.

4. In a speed indicating mechanism, a time operated clutch member, a second clutch member, an indicator, a movable support, a lever pivoted on said support, links connecting the opposite arms of said lever with said second clutch member and said indicator, respectively, and means operated by the mechanism whose speed is to be measured for moving said second clutch member to a given position and then engaging it with the time operated member.

5. In a speed indicating mechanism, a time operated clutch-member, a second clutch member movable into and out of engagement therewith, an indicator, a swinging arm, a lever pivoted on said arm, links connecting the opposite arms of said lever with said second clutch member and said indicator, respectively, and means actuated by the machine whose speed is to be measured for moving said arm to a given position each time the vehicle moves a given distance.

6. In a speed indicating mechanism, a time operated clutch member, a second clutch member movable into and out of engagement therewith, an indicator, a swinging arm, a lever pivoted on said arm, links connecting the opposite arms of said lever with said second clutch member and said indicator, respectively, and means for releasing the clutch members after the arm has reached a given position.

7. In a speed indicating mechanism a time operated clutch member, a second clutch member movable into and out of engagement therewith, an indicator, a swinging arm, a lever pivoted on said arm, links connecting the opposite arms of said lever with said second clutch member and said indicator, respectively, and means for returning the clutch member to its initial position.

8. In a speed indicator mechanism a time operated clutch member, a second clutch member adjustable into and out of engagement therewith, a pivoted indicator, a movable support, a centrally pivoted lever carried by said support, links connecting the opposite arms of said lever with said adjustable clutch member and said indicator respectively, a resetting device adapted to adjust the support to a given position each time said device is operated, and means for actuating said device each time the device whose speed is to be measured travels a given distance.

9. In a speed indicator mechanism a time operated clutch member, a second clutch member adjustable into and out of engagement therewith, a pivoted indicator, a crank for operating said indicator, a movable support, a centrally pivoted lever carried by said support, links connecting the opposite arms of said lever with said adjustable clutch member and said crank, respectively, a resetting device adapted to adjust the support to a given position each time said device is operated, and means for actuating said device each time the device whose speed is to be measured travels a given distance.

10. In a speed indicator mechanism, a time operated clutch member, a second clutch member adjustable into and out of engagement therewith, an indicator pivoted concentrically with said adjustable clutch member, a movable support, a centrally pivoted lever carried by said support, links connecting the opposite arms of said lever with said adjustable clutch member and said indicator respectively, a resetting device adapted to adjust the support to a given position each time said device is operated, and means for actuating said device each time the device whose speed is to be measured travels a given distance.

11. In a speed indicator mechanism, a time operated clutch member, a second clutch member adjustable into and out of engagement therewith, an indicator pivoted concentrically with said adjustable clutch member, a crank for operating said indicator, a movable support, a centrally pivoted lever carried by said support, links connecting the opposite arms of said lever with said adjustable clutch member and said crank, respectively, a resetting device adapted to adjust the support to a given position each time said device is operated, and means for actuating said device each time the device whose speed is to be measured travels a given distance.

12. In a speed indicator mechanism, a time operated clutch member, a second clutch member adjustable into and out of engagement therewith, a pivoted indicator, a movable support, a centrally pivoted lever carried by said support, links connecting the opposite arms of said lever with said adjustable clutch member and said indicator respectively, a resetting device adapted to adjust the support to a given position and then release the clutch members and move the adjustable clutch member to a given position, each time said device is operated, and means for actuating said device each time the device whose speed is to be measured travels a given distance.

13. In a speed indicator mechanism a time operated clutch member, a second clutch member adjustable into and out of engagement therewith, a pivoted indicator, a crank for operating said indicator, a movable support, a centrally pivoted lever carried by said support, links connecting the opposite arms of said lever with said adjustable clutch member and said crank, respectively, a resetting device adapted to adjust the support to a given position and then release the clutch member and move the adjustable clutch member to a given position each time said device is operated, and means for actuating said device each time the device whose speed is to be measured travels a given distance.

14. In a speed indicator mechanism, a time operated clutch member a second clutch member adjustable into and out of engagement therewith, a pivoted indicator having a crank connected thereto, an adjustable support, a centrally pivoted lever on said support, links connecting the arms of said lever with said adjustable clutch member and said crank respectively, a reciprocating resetting device having converging cam surfaces adapted to engage a part on said support and move said support to a given position and then release the clutch members when the resetting device is moved in one direction, said device being also adapted to return the adjustable clutch member to an initial position when the resetting device moves in the opposite direction.

15. In a speed indicator mechanism, a time operated clutch member, a second clutch member adapted to be driven thereby, an indicator, connections between said latter clutch member and the indicator whereby one may move without disturbing the other, and mechanism adapted to move the indicator while the clutch members are engaged and to then reset said second clutch member to a given initial position.

16. In a speed indicator mechanism, a time operated clutch member, a second clutch member adapted to be driven thereby, an indicator, connections between said latter clutch member and the indicator whereby one may move without disturbing the other, mechanism adapted to move the indicator while the clutch members are engaged and to then reset said second clutch member to a given initial position, and means for holding the indicator stationary while said second clutch member is being moved to its initial position.

17. In a speed indicator mechanism a time operated clutch member, a second clutch member and an indicator, all movable about a common axis, a brake for said indicator, a float lever, connections between the arms of said lever and said indicator and second clutch member respectively, permitting said latter member and indicator to move independently, mechanism adapted when operated to first move the pivotal point of the lever to a given position with respect to the common axis of the clutch members and indicator, then to release the clutch members and apply the brake to the indicator, and then to return said second clutch member to a given position, and means for operating said mechanism each time the device whose speed is to be indicated moves a given distance.

18. A speed indicator mechanism comprising a constantly driven clutch member, an adjustable clutch member movable into and out of engagement therewith, a slide adapted to disengage said clutch members when moved in one direction and to set said adjustable member backward to an initial position when moved in the opposite direction, said adjustable member and slide having coöperating cam surfaces whereby the clutch members are automatically disengaged after said members have been engaged for a given time, while the slide is stationary.

19. A speed indicator mechanism comprising an indicator, a shaft or sleeve upon which said indicator is mounted, a brake for said indicator shaft, a time operated clutch member and an adjustable clutch member movable about the same axis as tne indicatoi shaft, said adjustable clutch member being arranged between the time operated member and the indicator shaft and being provided with a collar, a reciprocable slide between said collar and the adjustable clutch member and normally cut out of engagement therewith, means for moving said slide into position to disengage the clutch members and apply the brake to the indicator shaft when the slide is moved in one direction, a temporary bed and means for holding said bed under the slide while the latter is moving in the opposite direction, and a shoulder or projection connected with said adjustable clutch member and adapted to be engaged by the slide when the slide moves in the latter direction.

20. A speed indicating mechanism for vehicles comprising an indicator, a time operated clutch member and a second clutch member movable into and out of engagement therewith, connections between the latter clutch member and the indicator permitting one to move without the other, and means for adjusting the position of the indicator according to the position of said second clutch member comprising a reciprocable slide, in combination with a magnet for operating said slide, a circuit for said magnet, and a circuit closing device operated by the movement of a vehicle wheel each time the wheel makes a stated number of revolutions.

21. A speed indicating mechanism for vehicles comprising an indicator, a time operated clutch member and a second clutch member movable into and out of engagement therewith, connections between the latter clutch member and the indicator permitting one to move without the other, and means for adjusting the position of the indicator according to the position of said second clutch member comprising a reciprocable slide, in combination with a magnet for operating said slide, a circuit for said magnet, a circuit closing device operated by the movement of a vehicle wheel each time the wheel makes a stated number of revolutions, and circuit connections whereby the circuit may be closed a greater or less number of times during a given number of revolutions of the wheel.

In testimony whereof I affix my signature, in presence of two witnesses.

RALPH SHIPMAN.

Witnesses:
ROBERT WATSON,
THOMAS HOWE.